(12) United States Patent
Snitil

(10) Patent No.: US 10,138,623 B2
(45) Date of Patent: Nov. 27, 2018

(54) MOUNTING SYSTEM FOR SINK

(71) Applicant: Moen Incorporated, North Olmsted, OH (US)

(72) Inventor: Ryan M. Snitil, North Royalton, OH (US)

(73) Assignee: Moen Incorporated, North Olmsted, OH (US)

( * ) Notice: Subject to any disclaimer, the term of this patent is extended or adjusted under 35 U.S.C. 154(b) by 220 days.

(21) Appl. No.: 15/138,916

(22) Filed: Apr. 26, 2016

(65) Prior Publication Data

US 2016/0319528 A1 Nov. 3, 2016

Related U.S. Application Data

(60) Provisional application No. 62/269,926, filed on Dec. 18, 2015, provisional application No. 62/155,850, filed on May 1, 2015.

(51) Int. Cl.
  *E03C 1/33* (2006.01)
  *F16B 35/04* (2006.01)
  *F16B 2/20* (2006.01)

(52) U.S. Cl.
  CPC ............... *E03C 1/335* (2013.01); *F16B 2/20* (2013.01); *F16B 35/041* (2013.01)

(58) Field of Classification Search
  CPC ........ F16B 35/041; F16B 35/042; E03C 1/33; E03C 1/335
  USPC .......... 411/417, 418.42, 421, 425, 413, 245, 411/551; 4/633, 634
  See application file for complete search history.

(56) References Cited

U.S. PATENT DOCUMENTS

| | | | | |
|---|---|---|---|---|
| 170,984 A | * | 12/1875 | Blundell | B30B 1/18 100/289 |
| 506,485 A | * | 10/1893 | Fichtner | F16B 39/12 411/245 |
| 2,752,609 A | | 7/1956 | Phelps | |
| 2,864,099 A | | 12/1958 | Strahs | |
| 2,883,677 A | | 4/1959 | Geen | |
| 2,992,436 A | | 7/1961 | Camp | |
| 3,008,150 A | * | 11/1961 | Lyon, Jr. | E03C 1/33 126/214 A |
| 3,034,142 A | * | 5/1962 | Lyon | E03C 1/33 24/326 |
| 3,040,338 A | * | 6/1962 | Zeleny | E03C 1/33 248/27.1 |
| 3,056,971 A | | 10/1962 | Hornik | |
| 3,229,310 A | | 1/1966 | Ensch | |
| 3,354,474 A | | 11/1967 | Cairns et al. | |
| 3,365,732 A | | 1/1968 | Juergens et al. | |
| 4,016,608 A | | 4/1977 | Khan | |

(Continued)

OTHER PUBLICATIONS

Moen Stainless Steel Drop-In Sinks—Installation Instructions (INS1247A-8/10), this document was publicly available prior to May 1, 2015, this document was obtained from the Moen.com website (6 pages).

(Continued)

*Primary Examiner* — Flemming Saether
(74) *Attorney, Agent, or Firm* — Calfee, Halter & Griswold LLP

(57) ABSTRACT

The present invention provides a mounting system for a sink that enables more installation steps to be completed from above a mounting surface in which the sink is mounted.

20 Claims, 21 Drawing Sheets

(56) References Cited

U.S. PATENT DOCUMENTS

| | | |
|---|---|---|
| 4,175,292 A | 11/1979 | Morrison |
| 4,186,761 A | 2/1980 | Guarnieri |
| 4,281,857 A | 8/1981 | Randall |
| 4,432,106 A | 2/1984 | Smith |
| 4,504,986 A | 3/1985 | Vigh |
| 4,538,340 A | 9/1985 | Ricke |
| 4,553,277 A | 11/1985 | Duncan |
| 4,998,555 A | 3/1991 | Barhydt, Sr. et al. |
| 5,010,922 A | 4/1991 | Agresta |
| 6,085,784 A | 7/2000 | Bloom et al. |
| 6,138,296 A | 10/2000 | Baker |
| 6,209,153 B1 | 4/2001 | Segien, Jr. |
| 6,216,992 B1 | 4/2001 | Bisonaya et al. |
| 6,301,728 B1 | 10/2001 | Pilatowicz et al. |
| 6,328,059 B1 | 12/2001 | Testori et al. |
| 6,385,798 B1 | 5/2002 | Burns et al. |
| 6,571,407 B1 | 6/2003 | Skarie |
| 6,745,416 B2 | 6/2004 | Albarran |
| 6,785,918 B2 | 9/2004 | Romo |
| 6,793,190 B2 | 9/2004 | White et al. |
| 7,003,818 B2 | 2/2006 | McNerney et al. |
| 7,174,581 B2 | 2/2007 | McNerney et al. |
| 7,185,376 B2 | 3/2007 | Brown |
| 7,296,588 B1 | 11/2007 | Hwang |
| 7,478,443 B2 | 1/2009 | Schneider et al. |
| 7,698,755 B2 | 4/2010 | McNerney et al. |
| 7,979,929 B2 | 7/2011 | Vogel et al. |
| 8,272,083 B1 | 9/2012 | Liston et al. |
| 8,490,276 B2 | 7/2013 | Julian |
| 8,528,129 B2 | 9/2013 | Li et al. |
| 8,899,259 B2 | 12/2014 | Jonte et al. |
| 8,925,571 B2 | 1/2015 | Li et al. |
| 9,382,702 B2 * | 7/2016 | Wisniewski .......... F16B 21/183 |
| 9,551,135 B2 | 1/2017 | Bors et al. |
| 2005/0263657 A1 * | 12/2005 | Demel .................. E03C 1/33 248/229.16 |
| 2008/0313803 A1 | 12/2008 | Osterroth et al. |

OTHER PUBLICATIONS

Franke EZ Torque—The new standard in sink installation, the Franke EZ Torque System is believed to have been publicly available prior to May 1, 2015, this document was obtained from the franke.com website (2 pages).

Franke EZ Torque—Installation Comparison, the Franke EZ Torque System is believed to have been publicly available prior to May 1, 2015, this document was obtained from the franke.com website (2 pages).

Franke Fast IN Quick Install System—Topmount Installation Instructions: Evolution Stainless Steel Sink (Evolution-INST 1 04-15), the Franke Fast IN Quick Install System is believed to have been publicly available at least as early as Jul. 31, 2015 (3 pages).

Franke Fast IN Quick Install System—Installation Instructions for Your Franke Stainless Steel Sink (FSSII0710 31219), the Franke Fast IN Quick Install System is believed to have been publicly available at least as early as Jul. 31, 2015, this document was obtained from the franke.com website (8 pages).

Franke Fast IN Quick Install System—photographs of components of system, the Franke Fast IN Quick Install System is believed to have been publicly available at least as early as Jul. 31, 2015, the components of the system were photographed by Moen Incorporated, the applicant and assignee of the application, the photographs have not been published (4 pages).

* cited by examiner

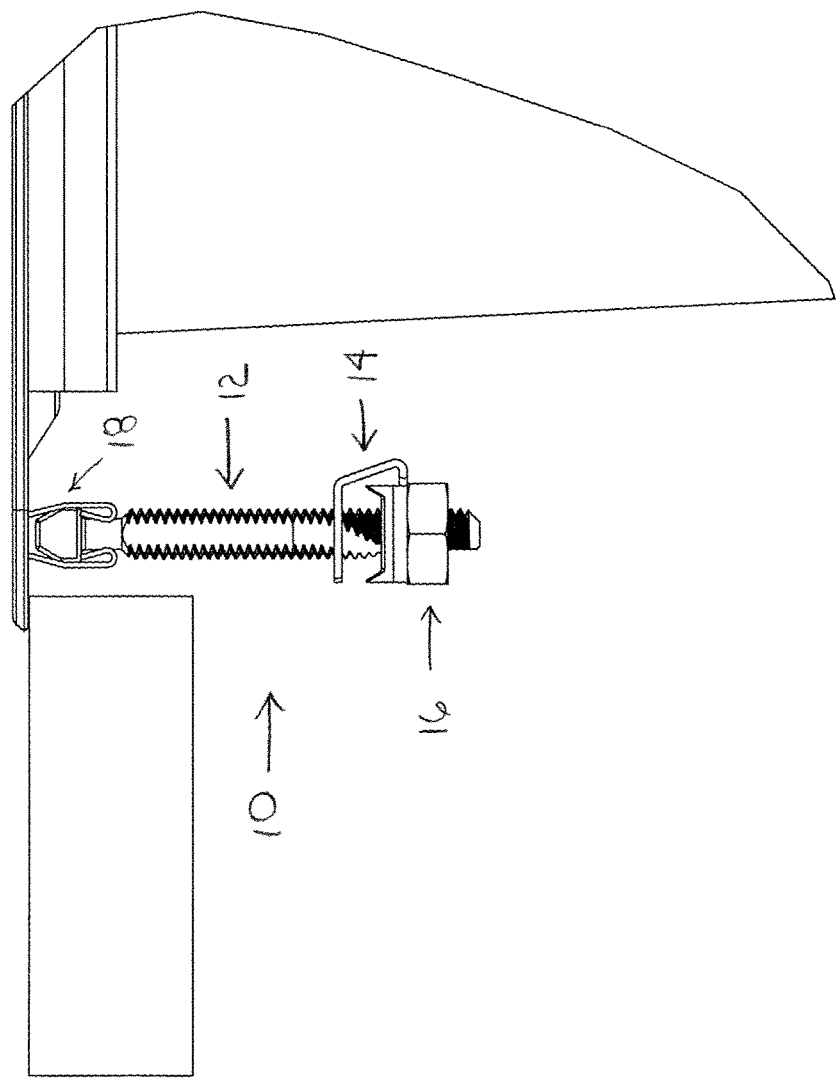

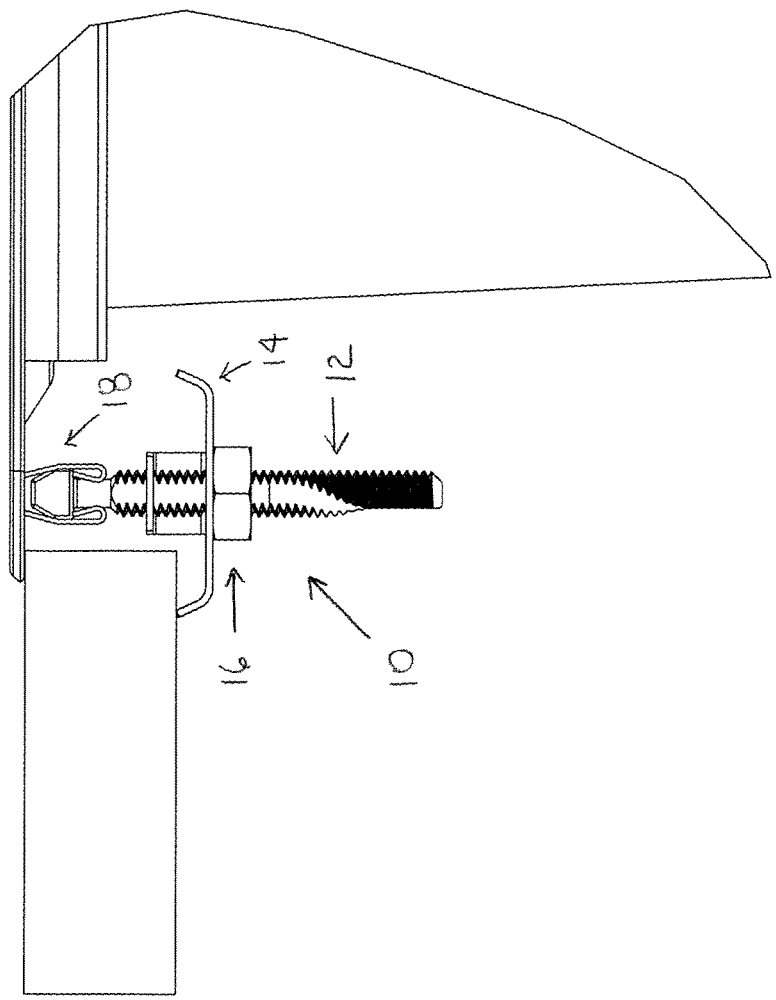

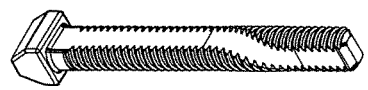
Figure 4a
12A
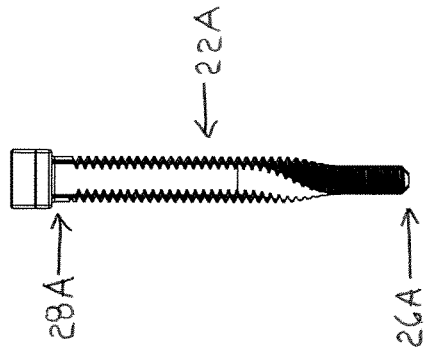
Figure 4e
28A
22A
26A
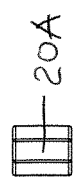
Figure 4f
20A
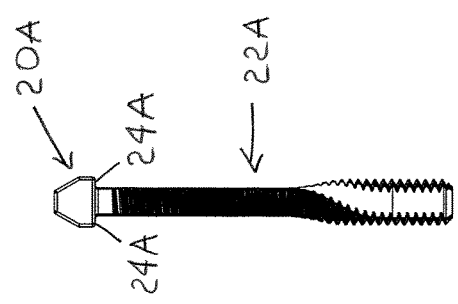
20A
24A
22A
24A
Figure 4b
Figure 4g
22A
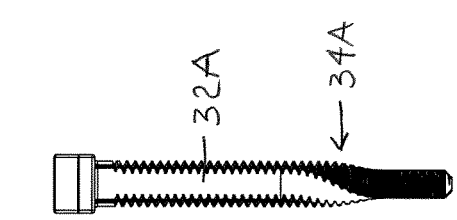
Figure 4d
32A
34A
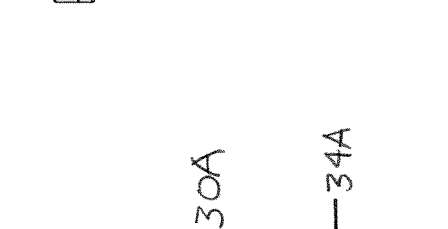
Figure 4c
30A
34A

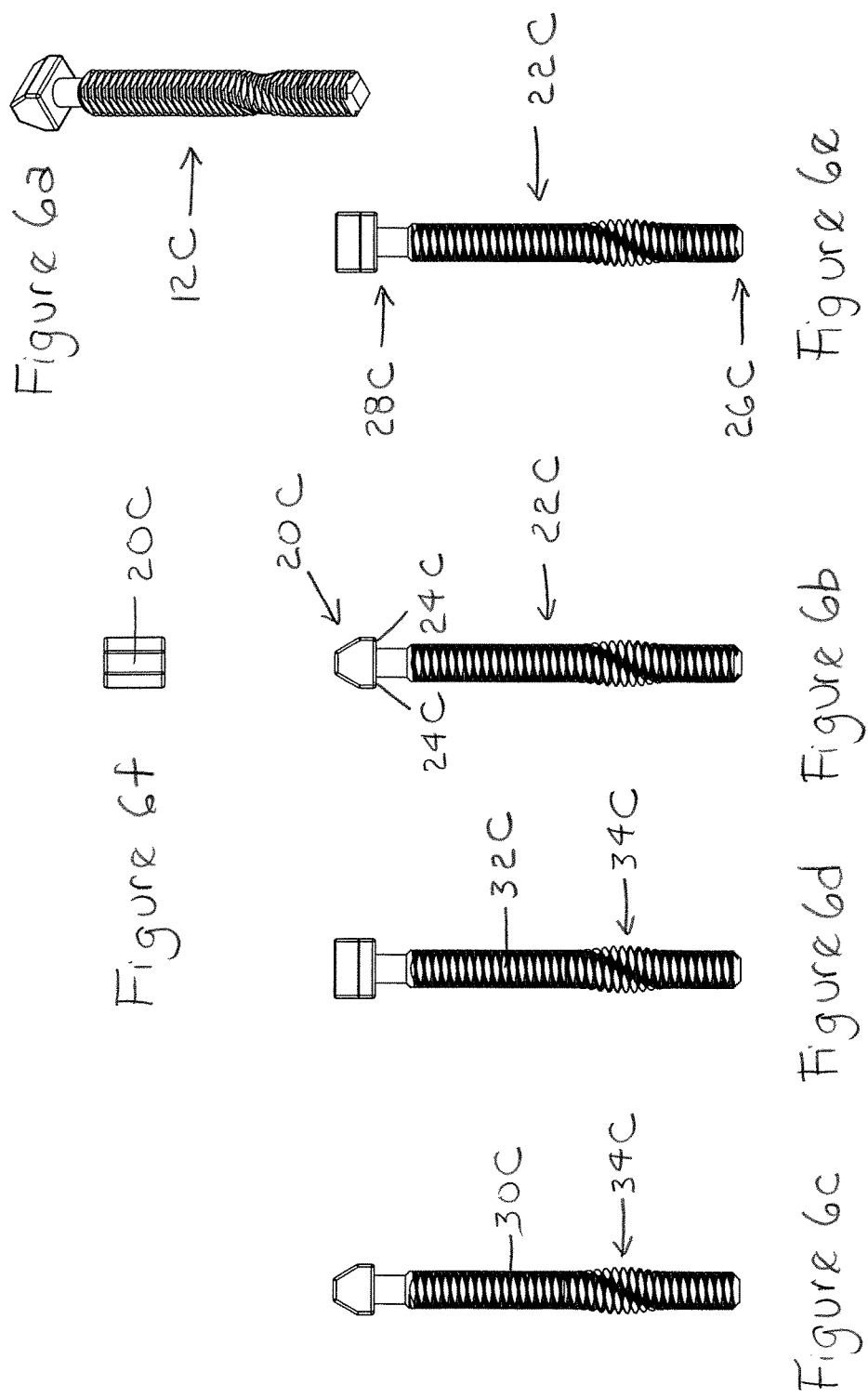

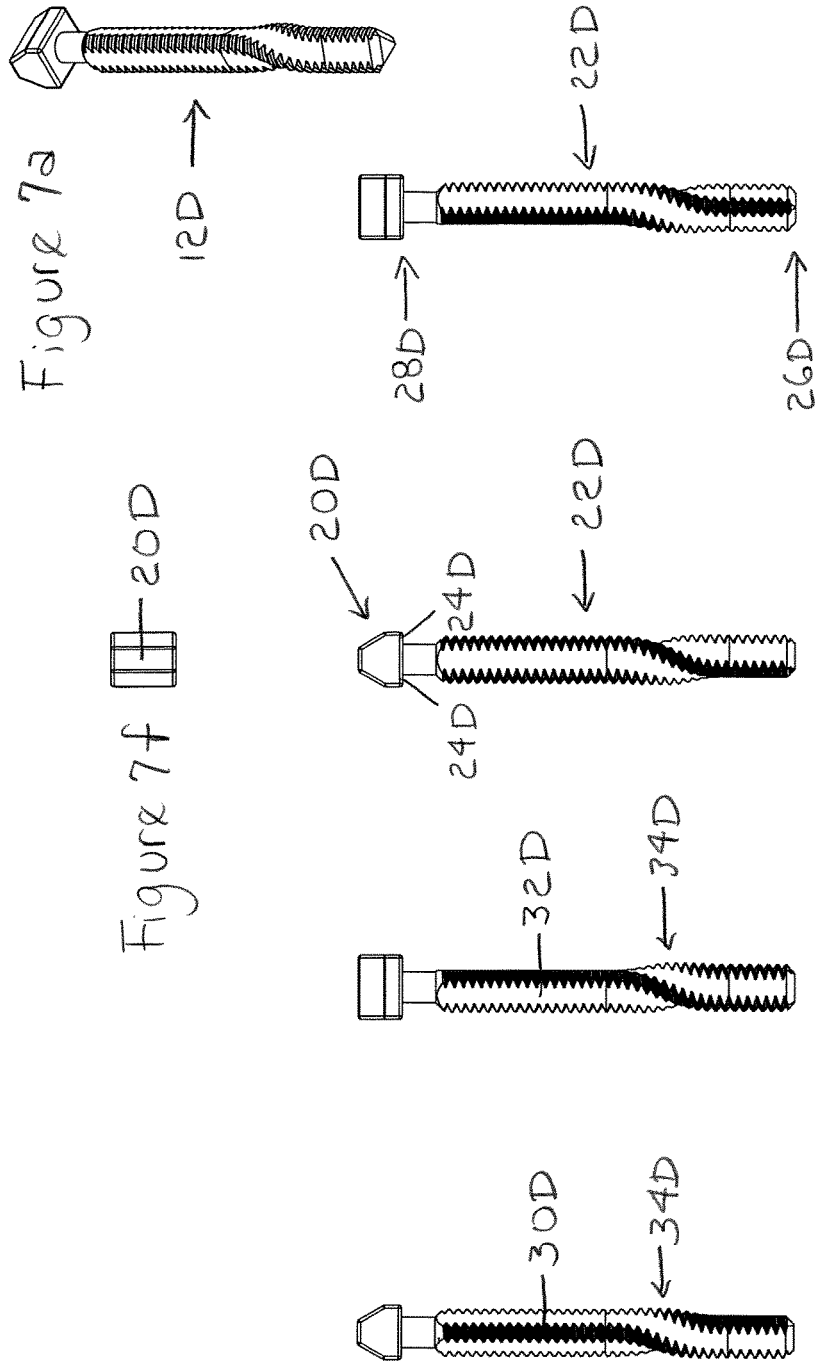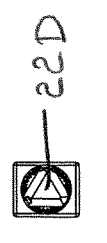
Figure 7a
Figure 7b
Figure 7c
Figure 7d
Figure 7e
Figure 7f
Figure 7g

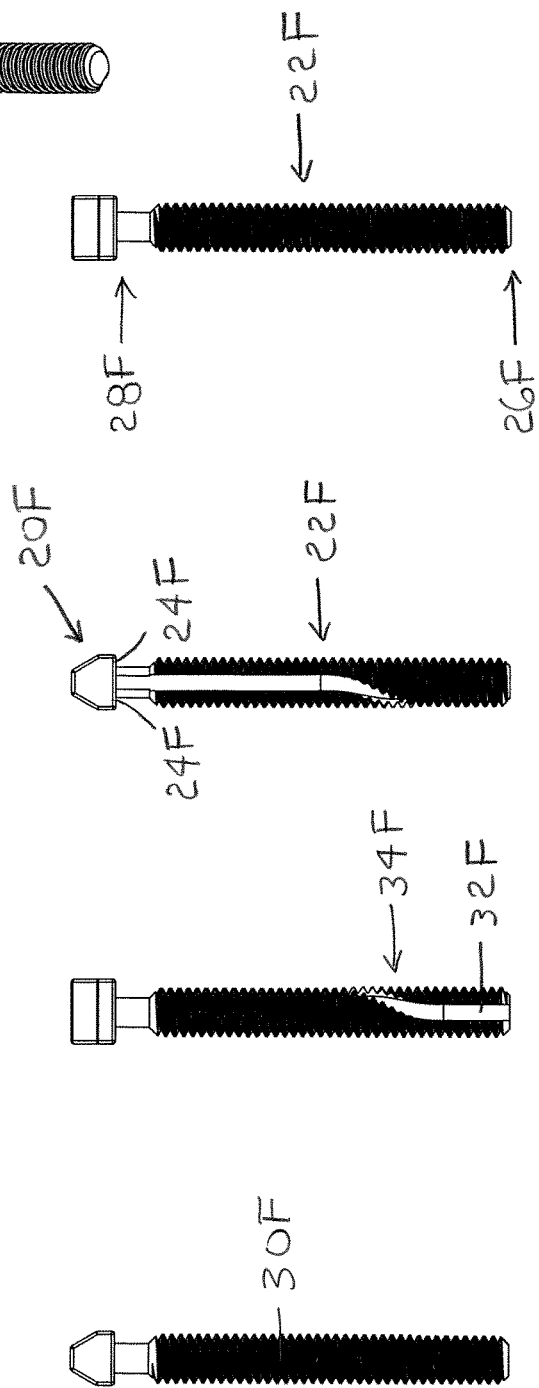

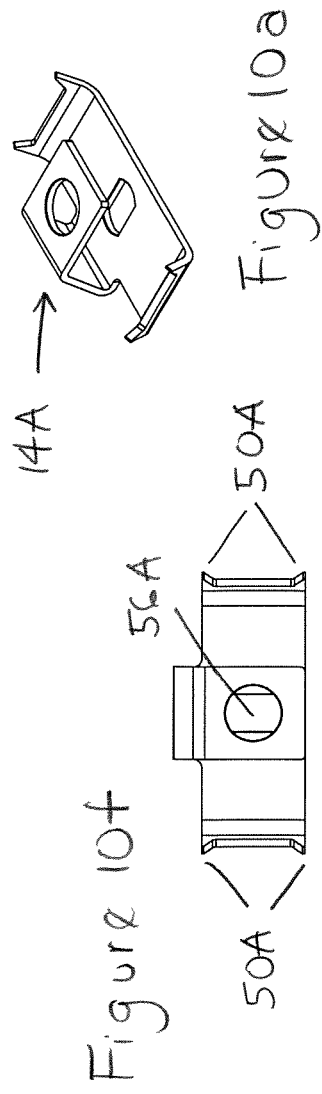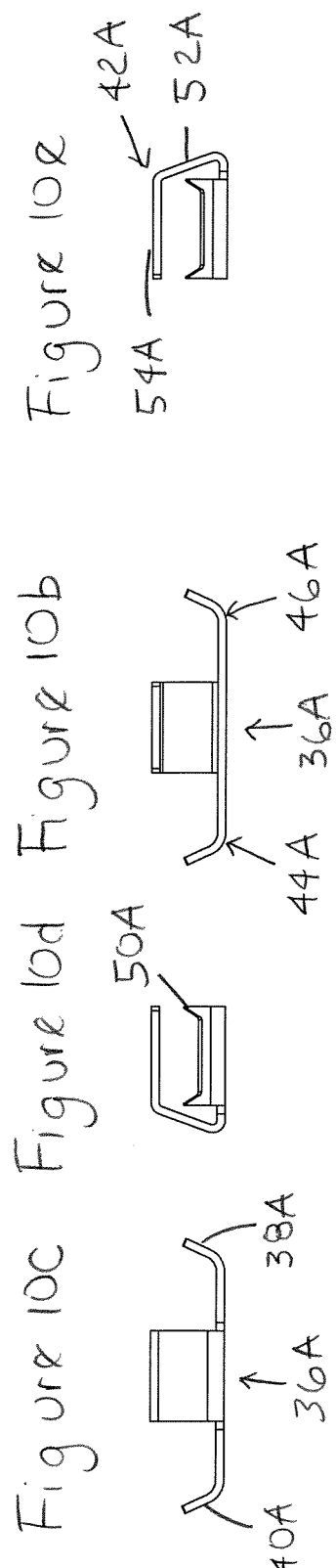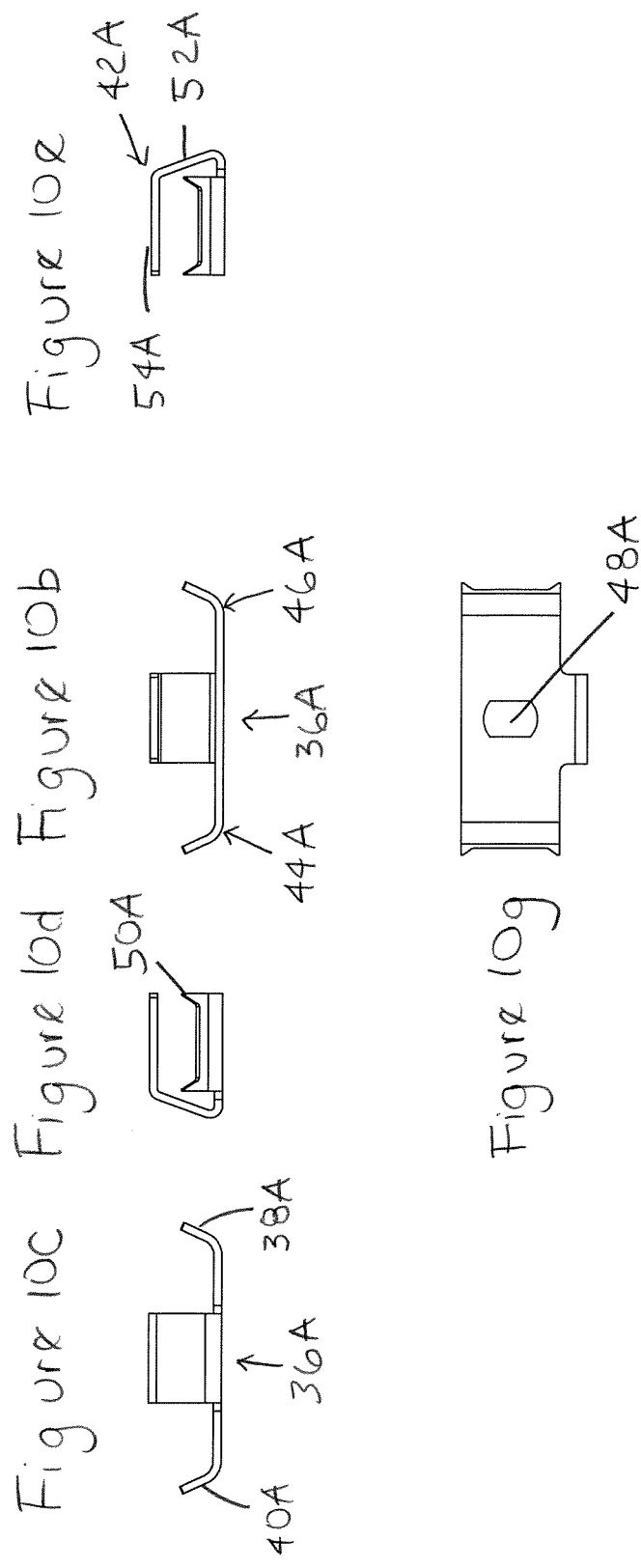

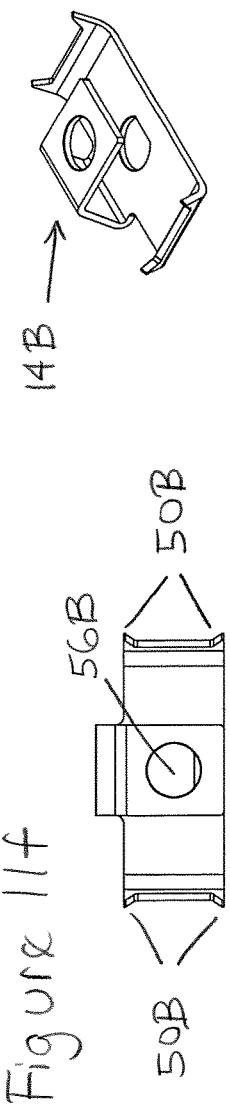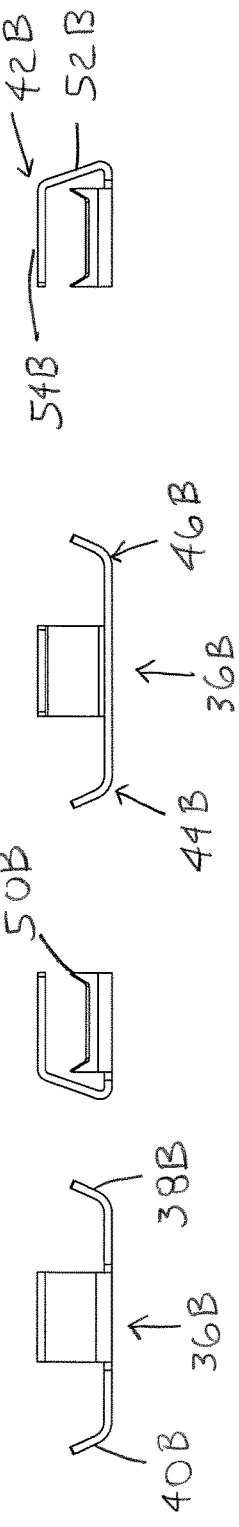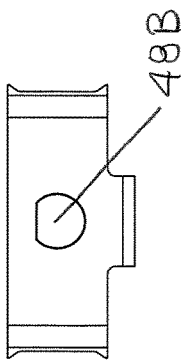

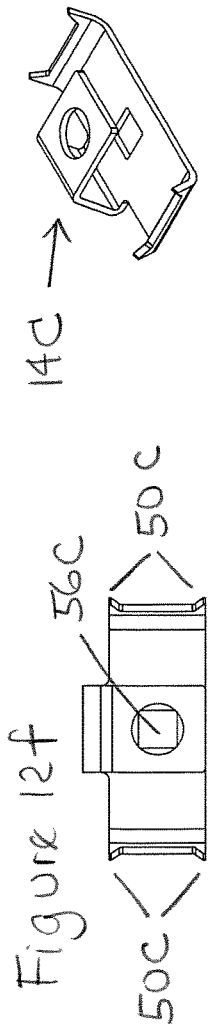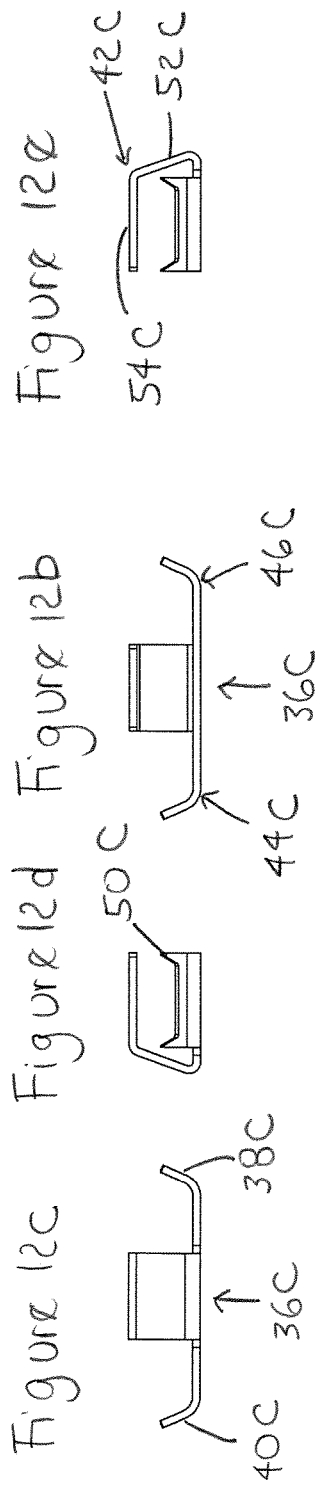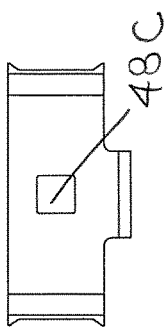

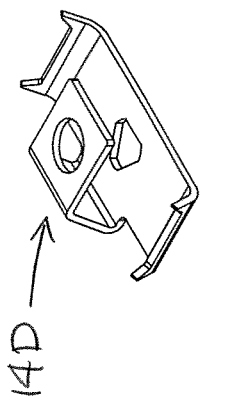
Figure 13a
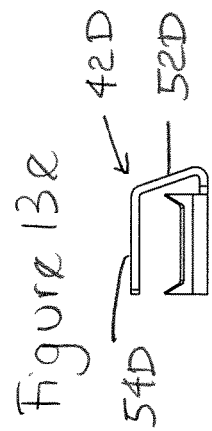
Figure 13e
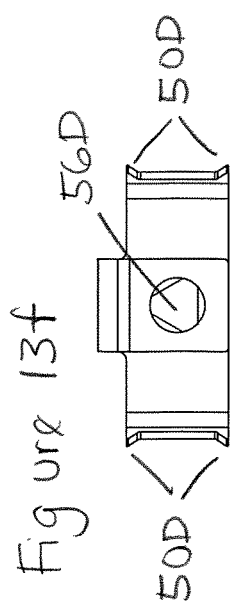
Figure 13f
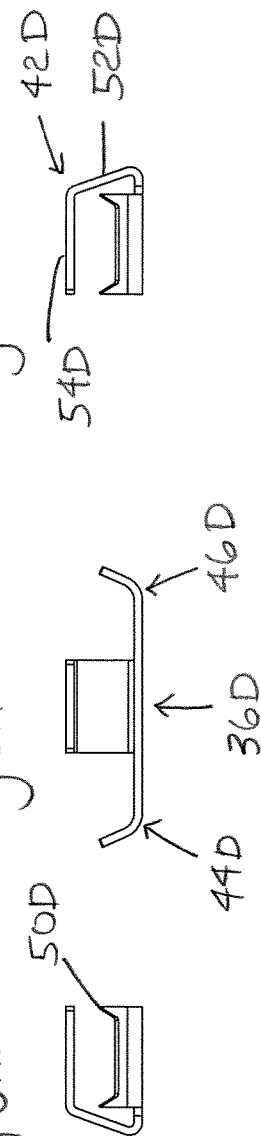
Figure 13b
Figure 13d
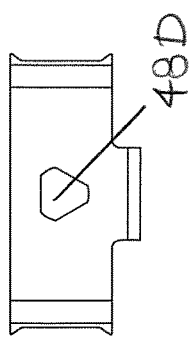
Figure 13g
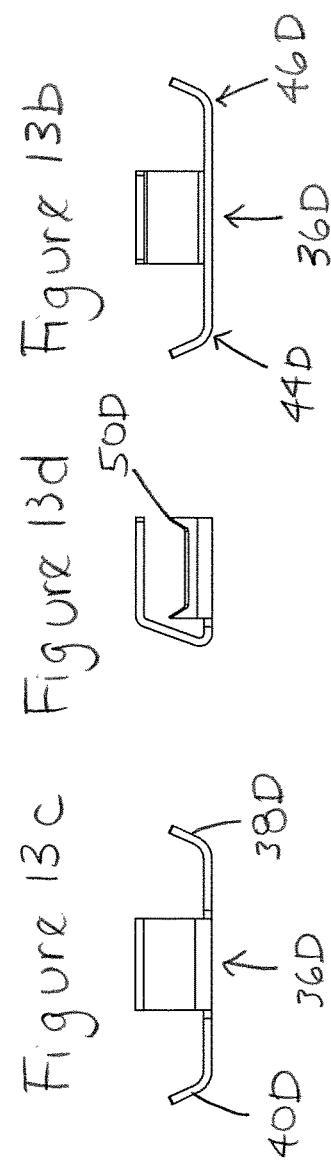
Figure 13c

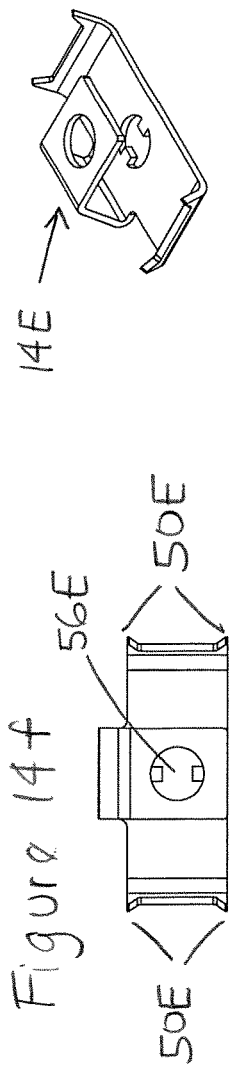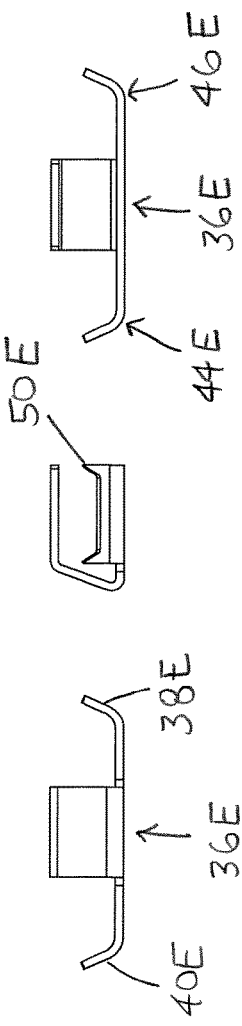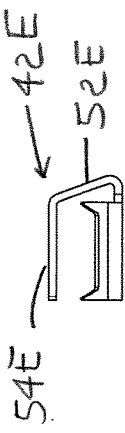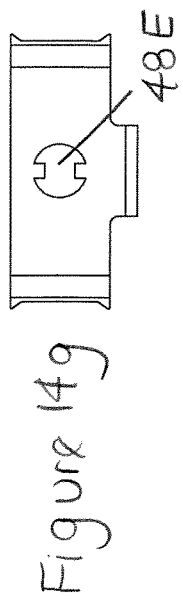

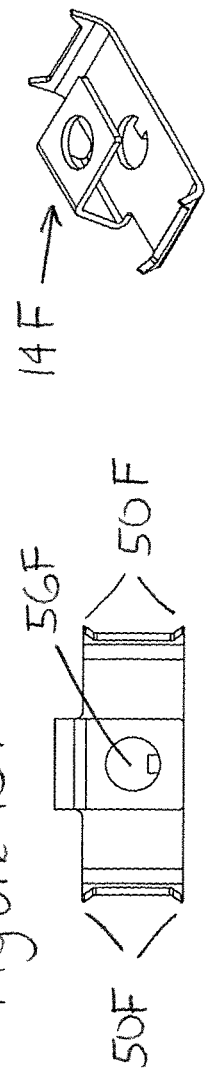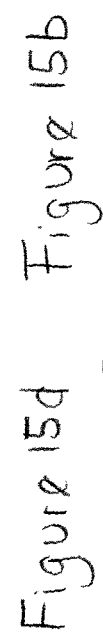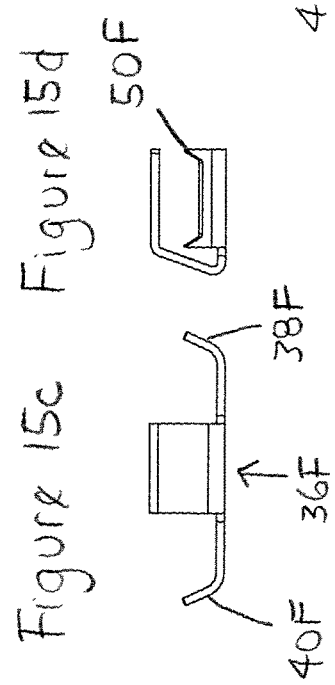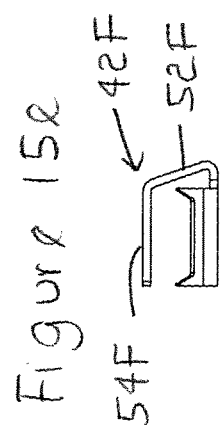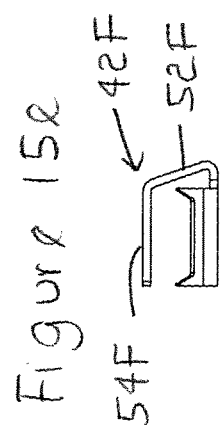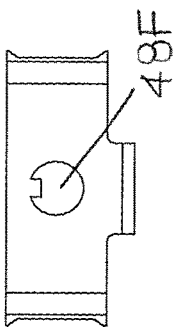

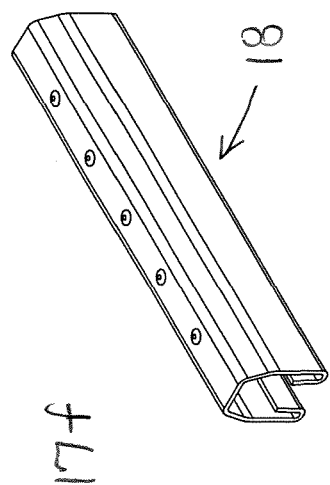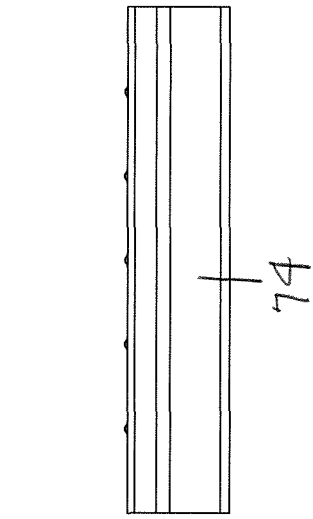
Figure 17f
18
Figure 17a
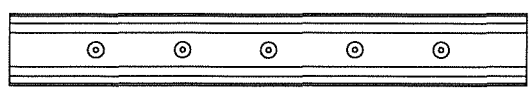
Figure 17e
18
74
Figure 17b
60 68 76 64
66 72 62
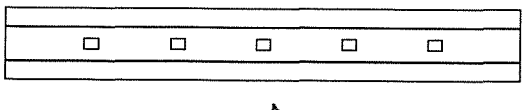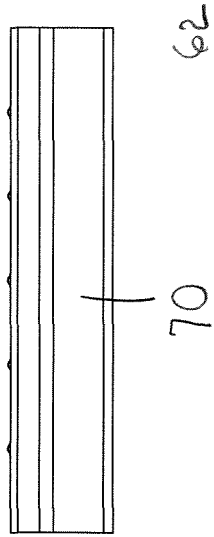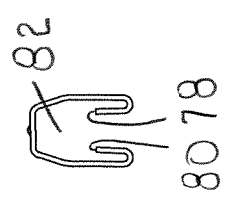
Figure 17g
18
Figure 17d
70
Figure 17c
82
80 78

MOUNTING SYSTEM FOR SINK

CROSS-REFERENCE TO RELATED APPLICATIONS

This application claims the benefit of U.S. Provisional Application No. 62/155,850, filed May 1, 2015, and U.S. Provisional Application No. 62/269,926, filed Dec. 18, 2015, the entire disclosures of which are hereby incorporated by reference.

FIELD

The present invention relates generally to a mounting system for a sink and, more particularly, to a mounting system for a sink that enables more installation steps to be completed from above a mounting surface in which the sink is mounted.

BACKGROUND

When installing a sink, the sink needs to be rigidly mounted in a mounting surface. Sinks can be difficult to mount when many of the installation steps need to be completed from below the mounting surface. A mounting system that enables more installation steps to be completed from above the mounting surface is desired.

SUMMARY

The present invention provides a mounting system for a sink that enables more installation steps to be completed from above a mounting surface in which the sink is mounted.

In an exemplary embodiment, the mounting system includes a stud and a clip. The stud includes a head and a shaft. The shaft includes a first end and a second end. The shaft includes a first longitudinal portion and a second longitudinal portion. The first longitudinal portion is circumferentially offset from the second longitudinal portion. The first longitudinal portion is different than the second longitudinal portion. The first longitudinal portion is threaded. The shaft has a twist between the first end and the second end. The shaft has a cross-sectional shape. The clip includes a base and an arm extending from the base. The base includes an opening. The opening has a shape that generally corresponds to the cross-sectional shape of the shaft of the stud. The opening in the clip is operable to receive the shaft of the stud. The clip is operable to be slid along the shaft of the stud. As the clip is slid along the shaft of the stud, the clip rotates from a first position below the twist to a second position above the twist.

In an exemplary embodiment, the mounting system includes a stud, a clip, and a nut. The stud includes a head and a shaft. The shaft includes a first end and a second end. The shaft includes a first longitudinal portion and a second longitudinal portion. The first longitudinal portion is circumferentially offset from the second longitudinal portion. The first longitudinal portion is different than the second longitudinal portion. The first longitudinal portion is threaded. The shaft has a twist between the first end and the second end. The shaft has a cross-sectional shape. The clip includes a base and an arm extending from the base. The base includes an opening. The opening has a shape that generally corresponds to the cross-sectional shape of the shaft of the stud. The nut includes a threaded opening. The stud is operable to be fixed relative to an underside of a sink and generally prevented from rotating relative to the underside of the sink. The opening in the clip is operable to receive the shaft of the stud. The clip is operable to be slid along the shaft of the stud. The nut is operable to be threaded onto the shaft of the stud. As the nut is threaded onto the shaft of the stud, the clip is slid along the shaft of the stud. As the clip is slid along the shaft of the stud, the clip rotates from a first position below the twist to a second position above the twist. In the first position, the arm of the clip does not underlie or contact an underside of a mounting surface in which the sink is mounted. In the second position, the arm of the clip underlies or contacts the underside of the mounting surface in which the sink is mounted.

In an exemplary embodiment, the mounting system includes a stud, a clip, a nut, and a clamp. The stud includes a head and a shaft. The shaft includes a first end and a second end. The shaft includes a first longitudinal portion and a second longitudinal portion. The first longitudinal portion is circumferentially offset from the second longitudinal portion. The first longitudinal portion is different than the second longitudinal portion. The first longitudinal portion is threaded. The shaft has a twist between the first end and the second end. The shaft has a cross-sectional shape. The clip includes a base and an arm extending from the base. The base includes an opening. The opening has a shape that generally corresponds to the cross-sectional shape of the shaft of the stud. The nut includes a threaded opening. The clamp includes a channel. The clamp is operable to be fixed relative to an underside of a sink. The head of the stud is operable to be received in the channel in the clamp such that the stud is generally prevented from rotating relative to the underside of the sink. The opening in the clip is operable to receive the shaft of the stud. The clip is operable to be slid along the shaft of the stud. The nut is operable to be threaded onto the shaft of the stud. As the nut is threaded onto the shaft of the stud, the clip is slid along the shaft of the stud. As the clip is slid along the shaft of the stud, the clip rotates from a first position below the twist to a second position above the twist. In the first position, the arm of the clip does not underlie or contact an underside of a mounting surface in which the sink is mounted. In the second position, the arm of the clip underlies or contacts the underside of the mounting surface in which the sink is mounted.

BRIEF DESCRIPTION OF THE DRAWINGS

FIGS. 1a-1c are views of a mounting system for a sink according to an exemplary embodiment of the present invention, the mounting system including a stud, a clip, a nut, and a clamp—FIG. 1a is an elevational view during drop-in of the sink, FIG. 1b is an elevational view after drop-in of the sink, but before rotation of the clip, and FIG. 1c is an elevational view after drop-in of the sink and after rotation of the clip;

—FIG. 2a is a perspective view, FIG. 2b is another perspective view, FIG. 2c is a front elevational view, and FIG. 2d is a right side elevational view;

—FIG. 3a is a perspective view, FIG. 3b is another perspective view, FIG. 3c is a front elevational view, and FIG. 3d is a left side elevational view;

FIGS. 4a-4g are views of a first embodiment of the stud—FIG. 4a is a perspective view, FIG. 4b is a front elevational view, FIG. 4c is a rear elevational view, FIG. 4d is a left side elevational view, FIG. 4e is a right side elevational view, FIG. 4f is a top plan view, and FIG. 4g is a bottom plan view;

—FIG. 5a is a perspective view, FIG. 5b is a front elevational view, FIG. 5c is a rear elevational view, FIG. 5d is a left side elevational view, FIG. 5e is a right side elevational view, FIG. 5f is a top plan view, and FIG. 5g is a bottom plan view;

FIGS. 6a-6g are views of a third embodiment of the stud—FIG. 6a is a perspective view, FIG. 6b is a front elevational view, FIG. 6c is a rear elevational view, FIG. 6d is a left side elevational view, FIG. 6e is a right side elevational view, FIG. 6f is a top plan view, and FIG. 6g is a bottom plan view;

FIGS. 7a-7g are views of a fourth embodiment of the stud—FIG. 7a is a perspective view, FIG. 7b is a front elevational view, FIG. 7c is a rear elevational view, FIG. 7d is a left side elevational view, FIG. 7e is a right side elevational view, FIG. 7f is a top plan view, and FIG. 7g is a bottom plan view;

—FIG. 8a is a perspective view, FIG. 8b is a front elevational view, FIG. 8c is a rear elevational view, FIG. 8d is a left side elevational view, FIG. 8e is a right side elevational view, FIG. 8f is a top plan view, and FIG. 8g is a bottom plan view;

FIGS. 9a-9g are views of a sixth embodiment of the stud—FIG. 9a is a perspective view, FIG. 9b is a front elevational view, FIG. 9c is a rear elevational view, FIG. 9d is a left side elevational view, FIG. 9e is a right side elevational view, FIG. 9f is a top plan view, and FIG. 9g is a bottom plan view;

FIGS. 10a-10g are views of a first embodiment of the clip for use with the stud of FIGS. 4a-4g—FIG. 10a is a perspective view, FIG. 10b is a front elevational view, FIG. 10c is a rear elevational view, FIG. 10d is a left side elevational view, FIG. 10e is a right side elevational view, FIG. 10f is a top plan view, and FIG. 10g is a bottom plan view;

FIGS. 11a-11g are views of a second embodiment of the clip for use with the stud of FIGS. 5a-5g—FIG. 11a is a perspective view, FIG. 11b is a front elevational view, FIG. 11c is a rear elevational view, FIG. 11d is a left side elevational view, FIG. 11e is a right side elevational view, FIG. 11f is a top plan view, and FIG. 11g is a bottom plan view;

FIGS. 12a-12g are views of a third embodiment of the clip for use with the stud of FIGS. 6a-6g—FIG. 12a is a perspective view, FIG. 12b is a front elevational view, FIG. 12c is a rear elevational view, FIG. 12d is a left side elevational view, FIG. 12e is a right side elevational view, FIG. 12f is a top plan view, and FIG. 12g is a bottom plan view;

FIGS. 13a-13g are views of a fourth embodiment of the clip for use with the stud of FIGS. 7a-7g—FIG. 13a is a perspective view, FIG. 13b is a front elevational view, FIG. 13c is a rear elevational view, FIG. 13d is a left side elevational view, FIG. 13e is a right side elevational view, FIG. 13f is a top plan view, and FIG. 13g is a bottom plan view;

FIGS. 14a-14g are views of a fifth embodiment of the clip for use with the stud of FIGS. 8a-8g—FIG. 14a is a perspective view, FIG. 14b is a front elevational view, FIG. 14c is a rear elevational view, FIG. 14d is a left side elevational view, FIG. 14e is a right side elevational view, FIG. 14f is a top plan view, and FIG. 14g is a bottom plan view;

FIGS. 15a-15g are views of a sixth embodiment of the clip for use with the stud of FIGS. 9a-9g—FIG. 15a is a perspective view, FIG. 15b is a front elevational view, FIG. 15c is a rear elevational view, FIG. 15d is a left side elevational view, FIG. 15e is a right side elevational view, FIG. 15f is a top plan view, and FIG. 15g is a bottom plan view;

—FIG. 16a is a perspective view, FIG. 16b is a front elevational view, FIG. 16c is a side elevational view, FIG. 16d is a top plan view, and FIG. 16e is a bottom plan view; and FIGS. 17a-17g are views of an embodiment of the clamp —FIG. 17a is a perspective view, FIG. 17b is a front elevational view, FIG. 17c is a rear elevational view, FIG. 17d is a left side elevational view, FIG. 17e is a right side elevational view, FIG. 17f is a top plan view, and FIG. 17g is a bottom plan view.

DETAILED DESCRIPTION

The present invention provides a mounting system for a sink. Exemplary embodiments of a mounting system 10 of the present invention are illustrated in FIGS. 1-17g.

Figure 1A:
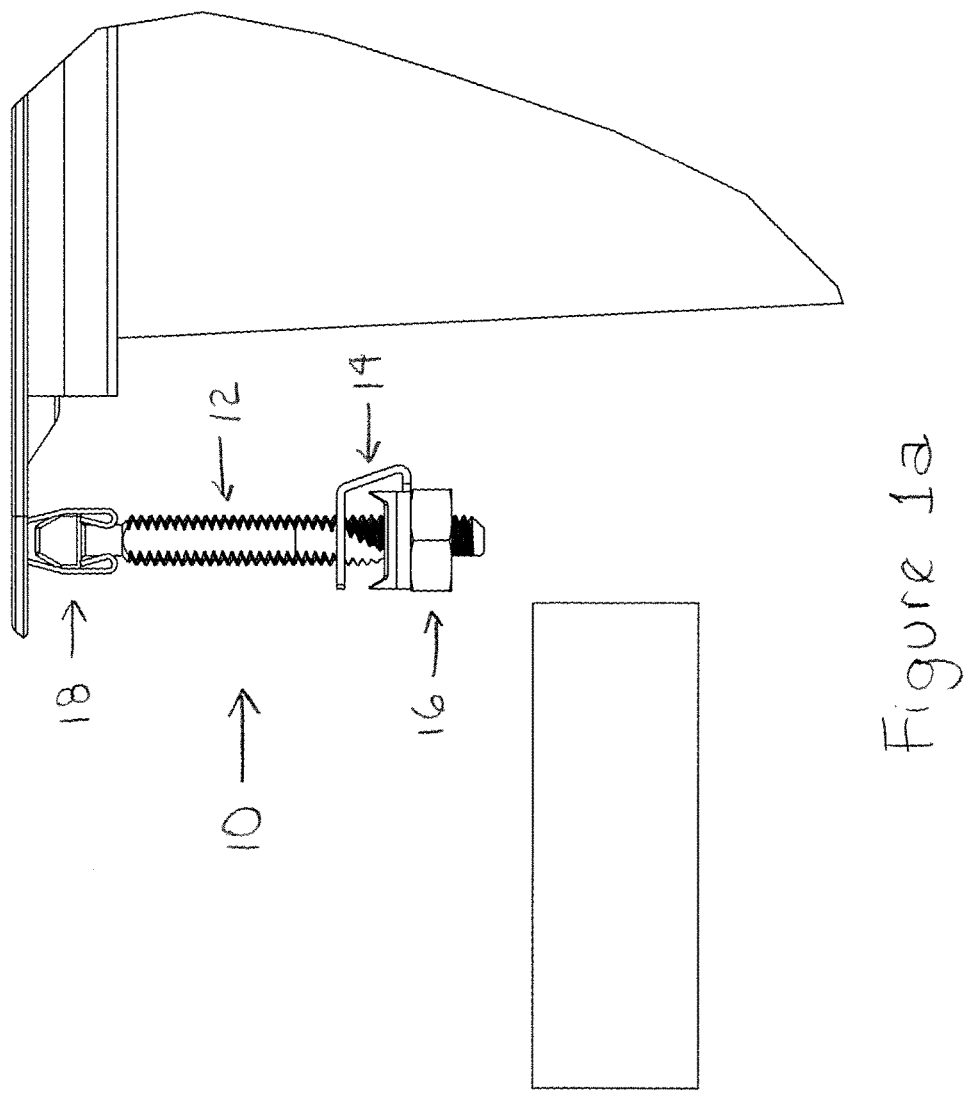
Figure 2A:
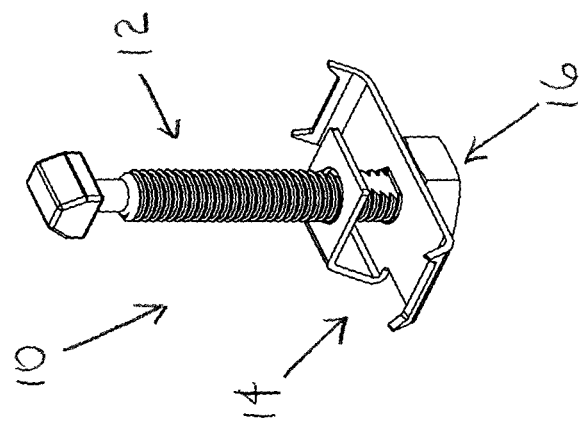
FIGS. 2a-2d are views of the stud and the clip in an assembled state with the clip below a twist in the stud
Figure 2B:
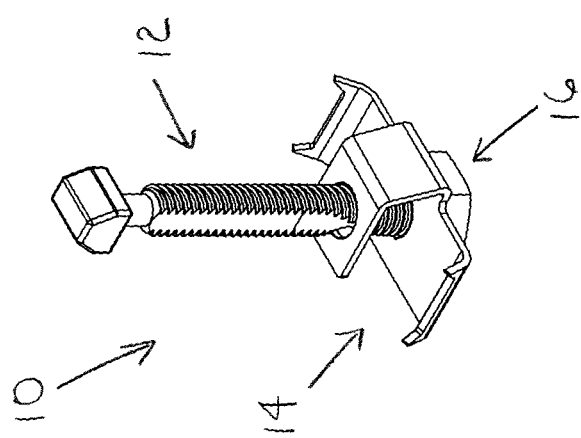
Figure 2D:
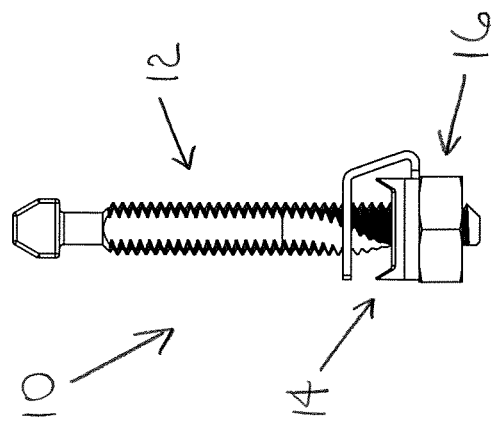
Figure 2C:
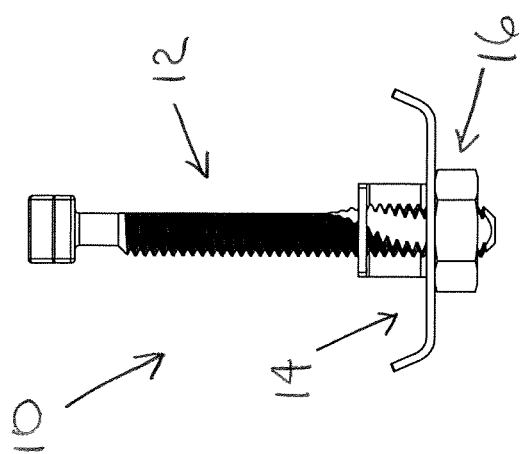
Figure 3B:
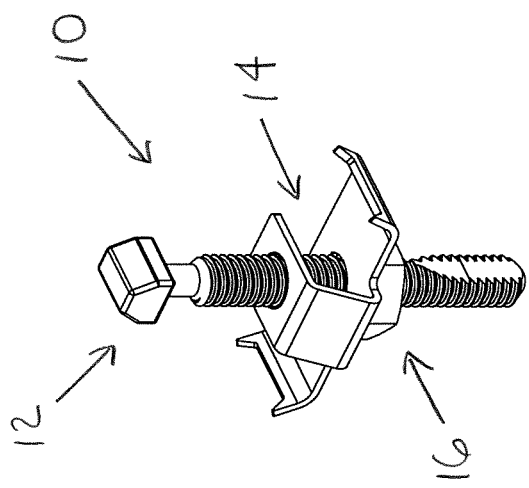
FIGS. 3a-3d are views of the stud and the clip with the clip above the twist in the stud
Figure 3A:
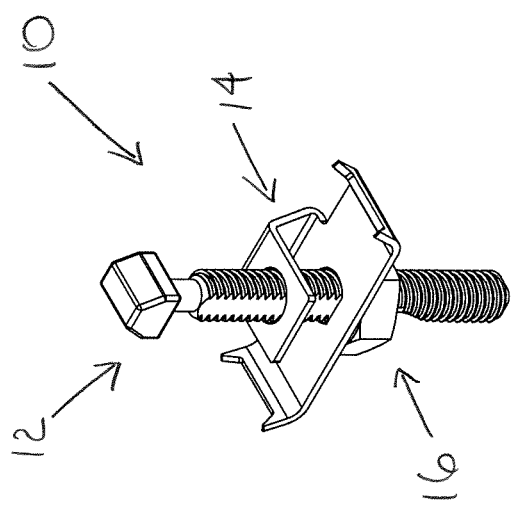
Figure 3C:
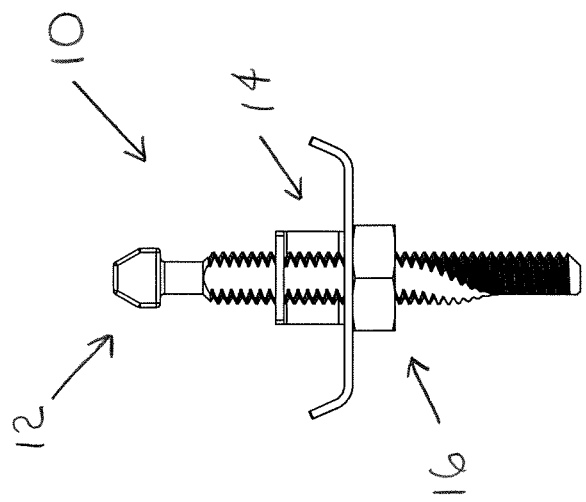
Figure 3D:
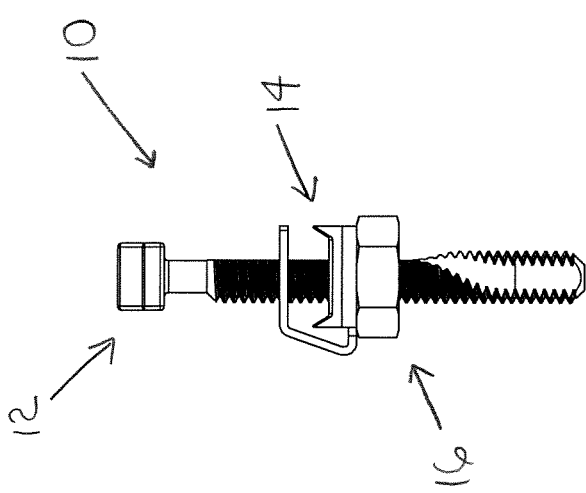
Figure 5A:
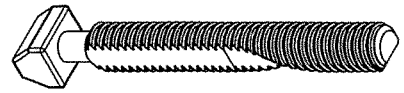
FIGS. 5a-5g are views of a second embodiment of the stud
Figure 5E:
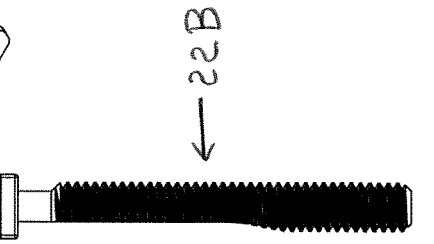
Figure 5F:
Figure 5B:
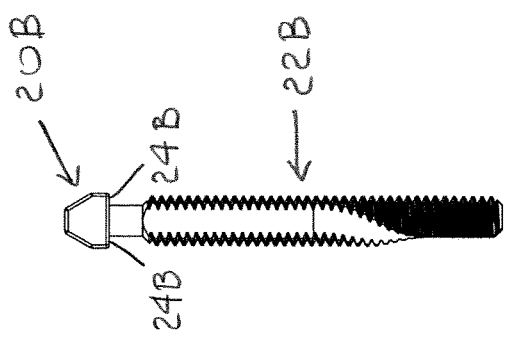
Figure 5G:
Figure 5D:
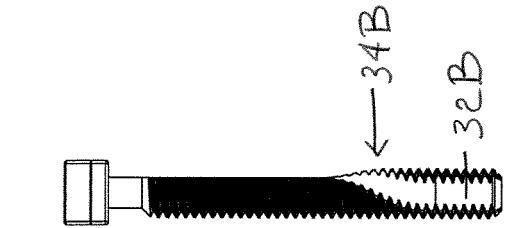
Figure 5C:
Figures 8A, 8B, 8C, 8D, 8E, 8F, 8G:
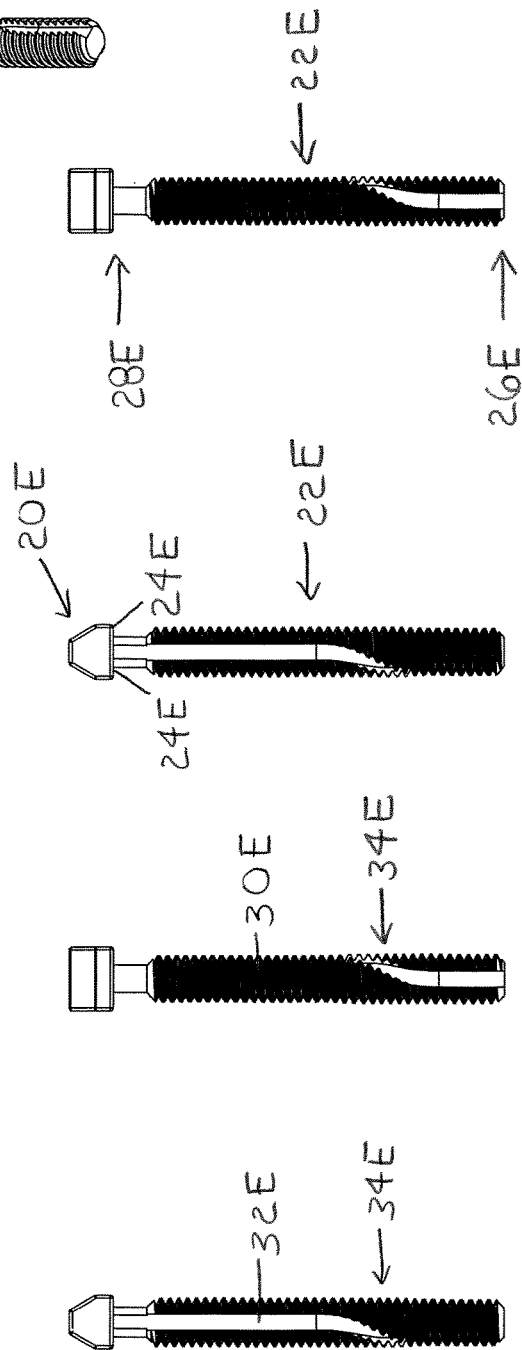
FIGS. 8a-8g are views of a fifth embodiment of the stud
Figure 16A:
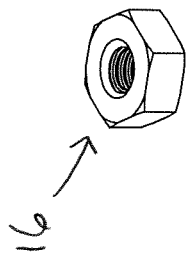
FIGS. 16a-16e are views of an embodiment of the nut
Figure 16D:
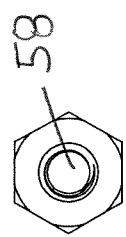
Figure 16B:
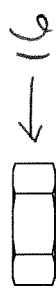
Figure 16E:
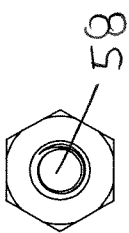
Figure 16C:

As illustrated in FIGS. 1a-1c, the mounting system 10 includes a stud 12, a clip 14, a nut 16, and a clamp 18. As illustrated in FIGS. 2a-2d and 3a-3d, the mounting system 10 includes a rotation feature that enables the clip 14 to automatically rotate relative to the stud 12 when the nut 16 is threaded onto the stud 12. FIGS. 2a-2d illustrate the mounting system 10 before rotation, and FIGS. 3a-3d illustrate the mounting system 10 after rotation.

Exemplary embodiments of the stud 12 are shown in detail in FIGS. 4a-4g, 5a-5g, 6a-6g, 7a-7g, 8a-8g, and 9a-9g. The same reference numbers in combination with different letters will be used to identify the different embodiments. A reference number alone or in combination with the letter X will be used to generically identify all embodiments.

In the illustrated embodiments, the stud 12X includes a head 20X and a shaft 22X. In the illustrated embodiments, the head 20X is wider than the shaft 22X. In the illustrated embodiments, the head 20X includes a shoulder 24X. The shaft 22X has a first end 26X and a second end 28X. In the illustrated embodiments, the shaft 22X is connected to the head 20X at the second end 28X of the shaft 22X.

In the illustrated embodiments, the shaft 22X includes a first longitudinal portion 30X and a second longitudinal portion 32X. The first longitudinal portion 30X is circumferentially offset from the second longitudinal portion 32X. The first longitudinal portion 30X is different than the second longitudinal portion 32X. The first longitudinal portion 30X is threaded. The shaft 22X has a twist 34X between the first end 26X and the second end 28X. In exemplary embodiments, the twist 34X in the shaft 22X is helical. The shaft 22X has a cross-sectional shape. In exemplary embodiments, the cross-sectional shape of the shaft 22X is non-circular. Exemplary embodiments of non-circular cross-sectional shapes are shown in FIGS. 4a-4g, 5a-5g, 6a-6g, 7a-7g, 8a-8g, and 9a-9g, and will be described in greater detail below.

In the illustrated embodiment of FIGS. 4a-4g, the shaft 22A includes two threaded longitudinal portions 30A alternating with two flat longitudinal portions 32A, and has a generally rectangular shaped cross-section. In the illustrated embodiment of FIGS. 5a-5g, the shaft 22B includes a curved threaded longitudinal portion 30B and a flat longitudinal portion 32B, and has a generally "D"-shaped cross-section. In the illustrated embodiment of FIGS. 6a-6g, the shaft 22C includes four curved threaded longitudinal portions 30C alternating with four flat threaded longitudinal portions 32C, and has a generally square/octagonal shaped cross-section. In the illustrated embodiment of FIGS. 7a-7g, the shaft 22D includes three curved threaded longitudinal portions 30D alternating with three flat longitudinal portions 32D, and has a generally triangular shaped cross-section. In the illustrated embodiment of FIGS. 8a-8g, the shaft 22E includes two curved threaded longitudinal portions 30E alternating with two notched longitudinal portions 32E, and has a generally double notch shaped cross-section. In the illustrated embodiment of FIGS. 9a-9g, the shaft 22F includes a curved threaded longitudinal portion 30F and a notched longitudinal portion 32F, and has a generally single notch shaped cross-section.

Exemplary embodiments of the clip 14 are shown in detail in FIGS. 10a-10g, 11a-11g, 12a-12g, 13a-13g, 14a-14g, and 15a-15g. As with the stud, the same reference numbers in combination with different letters will be used to identify the different embodiments. A reference number alone or in combination with the letter X will be used to generically identify all embodiments.

In the illustrated embodiments, the clip 14X includes a base 36X, a first arm 38X, a second arm 40X, and a platform 42X. In the illustrated embodiments, the base 36X is generally planar. The base 36X includes a first end 44X and a second end 46X. The base 36X includes an opening 48X. The opening 48X in the base 36X has a shape. The shape of the opening 48X in the base 36X generally corresponds to the cross-sectional shape of the shaft 22X of the stud 12X. In exemplary embodiments, the shape of the opening 48X in the base 36X is non-circular. Exemplary embodiments of non-circular shapes are shown in FIGS. 10a-10g, 11a-11g, 12a-12g, 13a-13g, 14a-14g, and 15a-15g, and will be described in greater detail below. In the illustrated embodiments, the first arm 38X extends generally upwardly from the first end 44X of the base 36X. In the illustrated embodiments, the second arm 40X extends generally upwardly from the second end 46X of the base 36X. In the illustrated embodiments, the first arm 38X and the second arm 40X each include teeth 50X.

In the illustrated embodiments, the platform 42X includes a first portion 52X and a second portion 54X. In the illustrated embodiments, the first portion 52X of the platform 42X extends generally upwardly from the base 36X. In the illustrated embodiments, the second portion 54X of the platform 42X extends generally parallel to the base 36X. In the illustrated embodiments, the second portion 54X of the platform 42X is generally planar. In the illustrated embodiments, the second portion 54X of the platform 42X includes a generally circular shaped opening 56X. The opening 56X in the second portion 54X of the platform 42X is generally aligned with the opening 48X in the base 36X.

In the illustrated embodiment of FIGS. 10a-10g, the opening 48X in the base 36X of the clip 14X has a generally rectangular shape. In the illustrated embodiment of FIGS. 11a-11g, the opening 48X in the base 36X of the clip 14X has a generally "D"-shape. In the illustrated embodiment of FIGS. 12a-12g, the opening 48X in the base 36X of the clip 14X has a generally square/octagonal shape. In the illustrated embodiment of FIGS. 13a-13g, the opening 48X in the base 36X of the clip 14X has a generally triangular shape. In the illustrated embodiment of FIGS. 14a-14g, the opening 48X in the base 36X of the clip 14X has a generally double notch shape. In the illustrated embodiment of FIGS. 15a-15g, the opening 48X in the base 36X of the clip 14X has a generally single notch shape.

An exemplary embodiment of the nut 16 is shown in detail in FIGS. 16a-16e. The nut 16 includes a generally circular shaped threaded opening 58.

An exemplary embodiment of the clamp 18 is shown in detail in FIGS. 17a-17g. In the illustrated embodiment, the clamp 18 includes a base 60, a first leg 62, and a second leg 64. In the illustrated embodiment, the base 60 is generally planar. The base 60 includes a first side 66 and a second side 68. In the illustrated embodiment, the first leg 62 includes a first portion 70 and a second portion 72. In the illustrated embodiment, the second leg 64 includes a first portion 74 and a second portion 76. In the illustrated embodiment, the first portion 70 of the first leg 62 extends generally downwardly from the first side 66 of the base 60. In the illustrated embodiment, the first portion 74 of the second leg 64 extends generally downwardly from the second side 68 of the base 60. In the illustrated embodiment, the second portion 72 of the first leg 62 extends generally upwardly from the first portion 70 of the first leg 62 forming a first ledge 78. In the illustrated embodiment, the second portion 76 of the second leg 64 extends generally upwardly from the second portion 76 of the second leg 64 forming a second ledge 80. A channel 82 is formed between the first leg 62 and the second leg 64.

In an exemplary embodiment, the base 60 of the clamp 18 is operable to be fixed relative to an underside of a sink. In an exemplary embodiment, the channel 82 in the clamp 18 is operable to receive the head 20 of the stud 12 such that the stud 12 is generally prevented from rotating relative to the underside of the sink. More specifically, the first ledge 78 formed by the second portion 72 of the first leg 62 of the clamp 18 and the second ledge 80 formed by the second portion 76 of the second leg 64 of the clamp 18 are operable to interface with the shoulder 24 of the head 20 of the stud 12. In an exemplary embodiment, the opening 56 in the second portion 54 of the platform 42 of the clip 14, the opening 48 in the base 36 of the clip 14, and the opening 58 in the nut 16 are operable to receive the shaft 22 of the stud 12. In an exemplary embodiment, the nut 16 is operable to be threaded onto the shaft 22 of the stud 12. In an exemplary embodiment, the clip 14 is operable to be slid along the shaft 22 of the stud 12.

The mounting of a sink using the mounting system 10 will now be described. In an exemplary embodiment, the base 60 of the clamp 18 is attached to an underside of a sink. The clip 14 is slid onto the shaft 22 of the stud 12 below the twist 34 in the shaft 22 of the stud 12. The nut 16 is threaded onto the shaft 22 of the stud 12 below the clip 14, thus preventing the clip 14 from sliding off the shaft 22 of the stud 12. The head 20 of the shaft 22 is inserted into the channel 82 in the clamp 18. The sink is inserted into an opening in a mounting surface, such as a countertop, from above the mounting surface. Once the sink has been inserted, the nut 16 is further threaded onto the shaft 22 of the stud 12. As the nut 16 is threaded onto the shaft 22 of the stud 12, the clip 14 is slid along the shaft 22 of the stud 12. As the clip 14 is slid along the twist 34 in the shaft 22 of the stud 12, the clip 14 automatically rotates approximately ninety degrees (90°) such that the first arm 38 or the second arm 40 of the clip 14 underlies an underside of the mounting surface. After the clip 14 rotates, the nut 16 continues to be threaded onto the shaft 22 of the stud 12 causing the clip 14 to continue to be slid up the shaft 22 of the stud 12 until the first arm 38 or the second arm 40 of the clip 14 contacts the underside of the mounting surface. The sink is now secured in the opening in the mounting surface.

The twist 34 in the shaft 22 of the stud 12 enables the clip 14 to automatically rotate from a first position below the twist 34 to a second position above the twist 34 as the clip 14 is slid along the shaft 22 of the stud 12. In the first position, the first arm 38 and the second arm 40 of the clip 14 do not underlie or contact the underside of the mounting surface in which the sink is mounted. As a result, the sink can be inserted into or removed from the mounting surface from above the mounting surface. In the second position, the first arm 38 or the second arm 40 of the clip 14 underlies or contacts the underside of the mounting surface in which the sink is mounted. As a result, the sink cannot be inserted into or removed from the mounting surface from above the mounting surface.

Although the clip 14 can rotate from a first position below the twist 34 to a second position above the twist 34 as the clip 14 is slid along the shaft 22 of the stud 12, the general correspondence of the shape of the opening 48 in the clip 14 and the cross-sectional shape of the shaft 22 of the stud 12 generally prevents the clip 14 from rotating around the shaft 22 of the stud 12 below the twist 34 and above the twist 34.

While the assembly and mounting steps have been described above in a particular order, one of ordinary skill in the art will appreciate that these steps do not need to be performed in this order. For example, as described above, the clip 14 is slid onto the shaft 22 of the stud 12 before the head 20 of the shaft 22 is inserted into the channel 82 in the clamp 18. However, one of ordinary skill in the art will appreciate that the head 20 of the shaft 22 could be inserted into the channel 82 in the clamp 18 and then the clip 14 could be slid onto the shaft 22 of the stud 12.

Additionally, while the mounting system 10 has been shown and described in the illustrated embodiments as including certain components, one of ordinary skill in the art will appreciate that the mounting system 10 does not need to include each of these components and/or the specifics of each of these components.

For example, while the shaft 22 of the stud 12 has been shown and described as including a first longitudinal portion 30 and a second longitudinal portion 32 that interface with the opening 48 in the base 36 of the clip 14, one of ordinary skill in the art will appreciate that the shaft 22 and the clip 14 could include other interfacing structure. The shaft 22 of the stud 12 should include at least one threaded longitudinal portion.

As another example, while the clip 14 has been shown and described as including a first arm 38 and a second arm 40, one of ordinary skill in the art will appreciate that the clip 14 could include more or less arms. Additionally, while the first arm 38 and the second arm 40 have been shown and described as including teeth 50, one of ordinary skill in the art will appreciate that the first arm 38 and the second arm 40 could include other structure that interfaces with the underside of the mounting surface.

As another example, while the clip 14 has been shown and described as including the platform 42, one of ordinary skill in the art will appreciate that the clip 14 could include other structure for interfacing with the shaft 22 of the stud 12. Furthermore, the clip 14 does not need to include the platform 42.

Further, while the mounting system 10 has been shown and described in the illustrated embodiments with the components connected in a particular manner, one of ordinary skill in the art will appreciate that the components of the mounting system 10 do not need to be connected in this manner. For example, as described above, the clamp 18 is attached to the underside of the sink and the head 20 of the stud 12 is inserted into the channel 82 in the clamp 18 with the shoulder 24 of the head 20 interfacing with the first ledge 78 and the second ledge 80 of the clamp 18. However, one of ordinary skill in the art will appreciate that the stud 12 and the clamp 18 could include other interfacing structure. Furthermore, the head 20 of the stud 12 could be attached directly to the underside of the sink, without the use of the clamp 18.

Additionally, while the mounting system 10 has been shown and described in the illustrated embodiments as operating in a particular manner, one of ordinary skill in the art will appreciate that the components of the mounting system 10 do not need to operate in this manner. For example, as described above, as the clip 14 is slid along the twist 34 in the shaft 22 of the stud 12, the clip 14 rotates approximately ninety degrees (90°). However, one of ordinary skill in the art will appreciate that the clip 14 could rotate more or less than ninety degrees (90°) so long as the clip 14 rotates from the first position in which the first arm 38 and the second arm 40 of the clip 14 do not underlie or contact the underside of the mounting surface in which the sink is mounted to the second position in which the first arm 38 or the second arm 40 of the clip 14 underlies or contacts the underside of the mounting surface in which the sink is mounted.

One of ordinary skill in the art will now appreciate that the present invention provides a mounting system for a sink that enables more installation steps to be completed from above a mounting surface in which the sink is mounted. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A sink mounting, comprising:
   a stud, the stud including a head and a shaft, the shaft including a first end and a second end, the shaft including a first longitudinal portion and a second longitudinal portion, the first longitudinal portion being circumferentially offset from the second longitudinal portion, the first longitudinal portion being different than the second longitudinal portion, the first longitudinal portion being threaded, the shaft having a twist between the first end and the second end, the shaft having a cross-sectional shape; and
   a clip, the clip including a base and an arm extending from the base, the base including an opening, the opening having a shape that generally corresponds to the cross-sectional shape of the shaft of the stud;
   wherein the opening in the clip is operable to receive the shaft of the stud;
   wherein the clip is operable to be slid along the shaft of the stud; and
   wherein, as the clip is slid along the shaft of the stud, the clip rotates from a first position below the twist to a second position above the twist.

2. The sink mounting of claim 1, wherein:
   the cross-sectional shape of the shaft of the stud is non-circular.

3. The sink mounting of claim 1, wherein:
   the opening in the base of the clip is non-circular.

4. The sink mounting of claim 1, wherein:
the arm includes teeth.

5. The sink mounting of claim 1, wherein:
the clip includes a platform extending from the base;
the platform includes an opening; and
the opening in the platform is generally aligned with the opening in the base.

6. The sink mounting of claim 1, wherein:
the platform includes a first portion and a second portion;
the first portion extends upwardly from the base;
the second portion extends generally parallel to the base; and
the second portion includes the opening in the platform.

7. The sink mounting of claim 1, wherein:
the second longitudinal portion is flat.

8. The sink mounting of claim 1, wherein:
the second longitudinal portion is threaded; and
a depth of threads in the first longitudinal portion is greater than a depth of threads in the second longitudinal portion.

9. A sink mounting, comprising:
a stud, the stud including a head and a shaft, the shaft including a first end and a second end, the shaft including a first longitudinal portion and a second longitudinal portion, the first longitudinal portion being circumferentially offset from the second longitudinal portion, the first longitudinal portion being different than the second longitudinal portion, the first longitudinal portion being threaded, the shaft having a twist between the first end and the second end, the shaft having a cross-sectional shape;
a clip, the clip including a base and an arm extending from the base, the base including an opening, the opening having a shape that generally corresponds to the cross-sectional shape of the shaft of the stud; and
a nut, the nut including a threaded opening;
wherein the stud is operable to be fixed relative to an underside of a sink and generally prevented from rotating relative to the underside of the sink;
wherein the opening in the clip is operable to receive the shaft of the stud;
wherein the clip is operable to be slid along the shaft of the stud;
wherein the nut is operable to be threaded onto the shaft of the stud;
wherein, as the nut is threaded onto the shaft of the stud, the clip is slid along the shaft of the stud;
wherein, as the clip is slid along the shaft of the stud, the clip rotates from a first position below the twist to a second position above the twist;
wherein, in the first position, the arm of the clip does not underlie or contact an underside of a mounting surface in which the sink is mounted; and
wherein, in the second position, the arm of the clip underlies or contacts the underside of the mounting surface in which the sink is mounted.

10. The sink mounting of claim 9, wherein:
the cross-sectional shape of the shaft of the stud is non-circular.

11. The sink mounting of claim 9, wherein:
the opening in the base of the clip is non-circular.

12. The sink mounting of claim 9, wherein:
the arm includes teeth.

13. The sink mounting of claim 9, wherein:
the clip includes a platform extending from the base;
the platform includes an opening; and
the opening in the platform is generally aligned with the opening in the base.

14. The sink mounting of claim 9, wherein:
the platform includes a first portion and a second portion;
the first portion extends upwardly from the base;
the second portion extends generally parallel to the base; and
the second portion includes the opening in the platform.

15. A sink mounting, comprising:
a stud, the stud including a head and a shaft, the shaft including a first end and a second end, the shaft including a first longitudinal portion and a second longitudinal portion, the first longitudinal portion being circumferentially offset from the second longitudinal portion, the first longitudinal portion being different than the second longitudinal portion, the first longitudinal portion being threaded, the shaft having a twist between the first end and the second end, the shaft having a cross-sectional shape;
a clip, the clip including a base and an arm extending from the base, the base including an opening, the opening having a shape that generally corresponds to the cross-sectional shape of the shaft of the stud;
a nut, the nut including a threaded opening; and
a clamp, the clamp including a channel;
wherein the clamp is operable to be fixed relative to an underside of a sink;
wherein the head of the stud is operable to be received in the channel in the clamp such that the stud is generally prevented from rotating relative to the underside of the sink;
wherein the opening in the clip is operable to receive the shaft of the stud;
wherein the clip is operable to be slid along the shaft of the stud;
wherein the nut is operable to be threaded onto the shaft of the stud;
wherein, as the nut is threaded onto the shaft of the stud, the clip is slid along the shaft of the stud;
wherein, as the clip is slid along the shaft of the stud, the clip rotates from a first position below the twist to a second position above the twist;
wherein, in the first position, the arm of the clip does not underlie or contact an underside of a mounting surface in which the sink is mounted; and
wherein, in the second position, the arm of the clip underlies or contacts the underside of the mounting surface in which the sink is mounted.

16. The sink mounting of claim 15, wherein:
the cross-sectional shape of the shaft of the stud is non-circular.

17. The sink mounting of claim 15, wherein:
the opening in the base of the clip is non-circular.

18. The sink mounting of claim 15, wherein:
the arm includes teeth.

19. The sink mounting of claim 15, wherein:
the clip includes a platform extending from the base;
the platform includes an opening; and
the opening in the platform is generally aligned with the opening in the base.

20. The sink mounting of claim 15, wherein:
the platform includes a first portion and a second portion;
the first portion extends upwardly from the base;
the second portion extends generally parallel to the base; and
the second portion includes the opening in the platform.

\* \* \* \* \*